US010282777B2

(12) United States Patent
Nations et al.

(10) Patent No.: US 10,282,777 B2
(45) Date of Patent: *May 7, 2019

(54) RECENTLY VIEWED ITEMS DISPLAY AREA

(71) Applicant: Target Brands, Inc., Minneapolis, MN (US)

(72) Inventors: Gregory M. Nations, Minneapolis, MN (US); Chad R. Gourley, Elk River, MN (US); Michael F. Gonsalves, Minneapolis, MN (US); Troy Neidermire, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 682 days.

This patent is subject to a terminal disclaimer.

(21) Appl. No.: 14/946,837

(22) Filed: Nov. 20, 2015

(65) Prior Publication Data

US 2016/0078526 A1 Mar. 17, 2016

Related U.S. Application Data

(62) Division of application No. 13/339,154, filed on Dec. 28, 2011, now Pat. No. 9,224,153.

(51) Int. Cl.
*G06Q 30/00* (2012.01)
*G06Q 30/06* (2012.01)
*G06Q 30/02* (2012.01)
*G06F 3/0482* (2013.01)
(Continued)

(52) U.S. Cl.
CPC ....... *G06Q 30/0643* (2013.01); *G06F 3/0482* (2013.01); *G06F 3/04847* (2013.01); *G06Q 30/02* (2013.01); *H04L 67/02* (2013.01)

(58) Field of Classification Search
CPC .................................. G06Q 30/00–08
See application file for complete search history.

(56) References Cited

U.S. PATENT DOCUMENTS

| 6,934,690 B1 * | 8/2005 | Van Horn | G06Q 30/06 |
| | | | 705/26.2 |
| 7,668,821 B1 * | 2/2010 | Donsbach | G06Q 30/0631 |
| | | | 707/765 |
| 9,224,153 B2 * | 12/2015 | Nations | G06Q 30/02 |

(Continued)

FOREIGN PATENT DOCUMENTS

WO WO-2009120268 A2 * 10/2009 ........... G06F 3/0481

OTHER PUBLICATIONS

TGT—Target Financial Community Meeting, Jan. 21, 2010 (Year: 2010).*

(Continued)

*Primary Examiner* — Michael Misiaszek
(74) *Attorney, Agent, or Firm* — Merek, Blackmon & Voorhees, LLC (57) ABSTRACT

A most recently viewed item is displayed in a display element, which is positioned next to at least one other element on a web page. The display element is expanded so that the element covers the at least one other element on the web page and so that at least one other recently viewed item appears in the display element. The display element is contracted so that only the most recently viewed item appears in the display element and so that the at least one other element on the web page is visible.

20 Claims, 8 Drawing Sheets

(51) Int. Cl.
*G06F 3/0484* (2013.01)
*H04L 29/08* (2006.01)

(56) References Cited

U.S. PATENT DOCUMENTS

| | | | | |
|---|---|---|---|---|
| 2003/0131357 | A1* | 7/2003 | Kim | H04N 5/445 725/60 |
| 2005/0102202 | A1* | 5/2005 | Linden | G06Q 30/02 705/26.7 |
| 2006/0259462 | A1* | 11/2006 | Timmons | G06F 16/90335 |
| 2007/0186183 | A1* | 8/2007 | Hudson, Jr. | G06F 3/0482 715/810 |
| 2008/0189647 | A1* | 8/2008 | Tapuska | G06F 16/9577 715/781 |
| 2008/0295037 | A1* | 11/2008 | Cao | G06F 3/0482 715/852 |
| 2009/0063299 | A1* | 3/2009 | Amacker | G06Q 30/0603 705/26.64 |
| 2009/0172090 | A1* | 7/2009 | Lit | G06F 3/0481 709/203 |
| 2009/0204929 | A1* | 8/2009 | Baurmann | H04N 5/44543 715/836 |
| 2009/0265255 | A1* | 10/2009 | Jackson | G06Q 30/06 705/26.1 |
| 2009/0281926 | A1* | 11/2009 | Lin-Hendel | G06Q 30/0601 705/26.1 |
| 2009/0300545 | A1* | 12/2009 | Pai | G06Q 30/02 715/811 |
| 2010/0153831 | A1* | 6/2010 | Beaton | G06Q 30/02 715/201 |
| 2011/0138326 | A1* | 6/2011 | Roberts | G06Q 30/02 715/808 |
| 2011/0145753 | A1* | 6/2011 | Prakash | G06F 3/0481 715/783 |
| 2011/0289139 | A1* | 11/2011 | McIntosh | H04N 21/252 709/203 |

OTHER PUBLICATIONS

Steve Eastman Presentation, Target Managers Meeting, Mar. 15, 2010 (Year: 2010).*

* cited by examiner

RECENTLY VIEWED ITEMS DISPLAY AREA

The subject patent application is a division of U.S. patent application Ser. No. 13/339,154 filed on Dec. 28, 2011 from which priority is claimed under 35 USC § 120. The entire content of U.S. patent application Ser. No. 13/339,154 is incorporated herein by reference.

BACKGROUND

On retail websites, online customers are able to shop for products. Typically, these websites include one or more browsing pages that show a large number of products in a small space to make it easier for customers to browse through the available inventory. To allow for a large number of products to be displayed, a limited amount of information is provided for each product on the browsing pages.

To obtain more information about a particular product, the user may select the product from the browsing page. This will cause a new webpage to be displayed that shows more details about the selected product. When a user chooses to view the details of a particular product, many retail systems consider that the customer has viewed the item. If the customer does not select the item to view its details, the system cannot be sure that the user has seen the item. As a result, even though the item may be displayed on a page with a number of other items, the retail system cannot determine that the user has actually viewed the item until they select the item.

On some retail websites, customers can view the items they have recently viewed. These websites keep a record of the items that have been viewed in detail and provide the list to the customer when requested.

The discussion above is merely provided for general background information and is not intended to be used as an aid in determining the scope of the claimed subject matter. The claimed subject matter is not limited to implementations that solve any or all disadvantages noted in the background.

SUMMARY

A most recently viewed item is displayed in a display element, which is positioned next to at least one other element on a web page. The display element is expanded so that the element covers the at least one other element on the web page and so that at least one other recently viewed item appears in the display element. The display element is contracted so that only the most recently viewed item appears in the display element and so that the at least one other element on the web page is visible.

In a further embodiment, a processor generates a graphical viewed-items element, with an image of a last-viewed item within the viewed-items element. An input is received to enlarge the viewed-items element. In response to the input, a graphical enlarged viewed-items element is generated, wherein the image of the last-viewed item and an image of a penultimate viewed item are displayed within the enlarged viewed-items element.

In another embodiment, a plurality of recently viewed products is displayed in a first-sized container using a processor and a display. An input indicating that the first-sized displayed container should be collapsed is received. In response to the input, the size of the container is automatically reduced to form a collapsed container so that only a most recently viewed product appears in the collapsed container.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

In the embodiments discussed below, a recently viewed items container is provided that can be in either an expanded state or a collapsed state. In the collapsed state, the recently viewed items container shows only the most recently viewed item. In the expanded state, the recently viewed items container expands to show a number of recently viewed items. In accordance with one embodiment, the recently viewed items container expands just enough to show all of the recently viewed items. When the recently viewed items container has expanded to its maximum amount and there are more recently viewed items than can fit in the expanded container, carousel controls are added to the container to allow a user to rotate through the items in the recently viewed items list. Even after such carousel movement, if the user selects to collapse the recently viewed items container, the most recently viewed item appears once again in the collapsed recently viewed items container.

Figure 1:
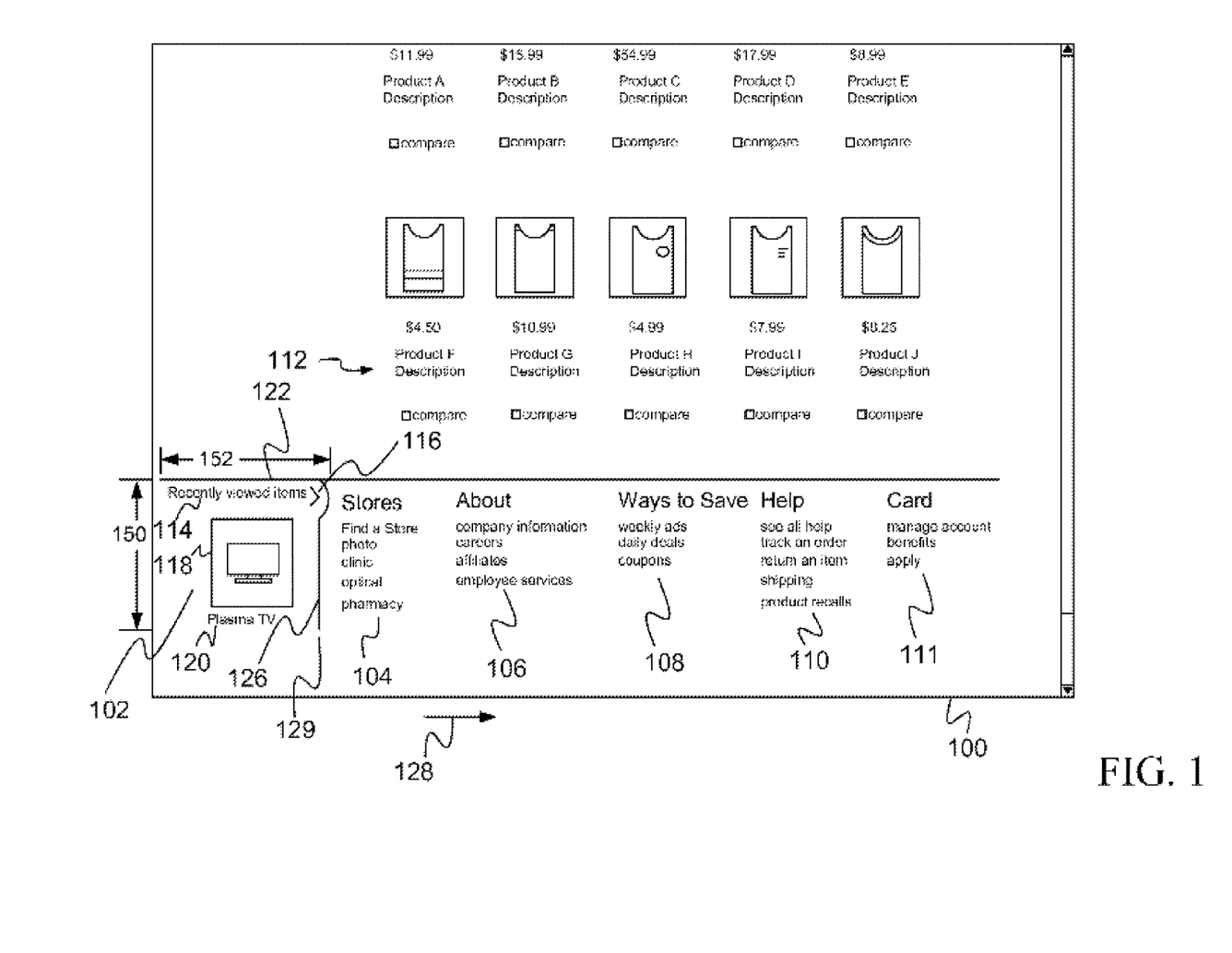
FIG. 1 is view of a display showing a collapsed recently viewed items container in accordance with one embodiment.

FIG. 1 provides an example of graphical images displayed in accordance with one embodiment. In FIG. 1, a display 100 shows a recently viewed items container 102 and neighboring text columns 104, 106, 108, 110 and 111. Display 100 also shows content 112, which is above recently viewed items container 102.

Recently viewed items container 102, alternatively referred to as a window, a graphical element, a first-sized displayed container and a viewed-items element, 102 includes "recently viewed items" text 114, expand icon 116, an image 118 of a most-recently viewed item and text 120 that describes the most-recently viewed item. Container 102 is shown to have a visible top border 122 and visible right side edge/end 126. However, in accordance with other embodiments, the visible border may also be present on the bottom and left side edge of container 102. Container 102 has a height 150 and a width 152.

Expansion icon 116 may be selected by positioning a cursor over expansion icon 116 and pressing a selection button or by tapping on icon 116 directly when using a touch screen. Under most embodiments, if there is only one recently viewed item, expansion icon 116 is not displayed and it is not possible to expand container 102.

Figure 2:
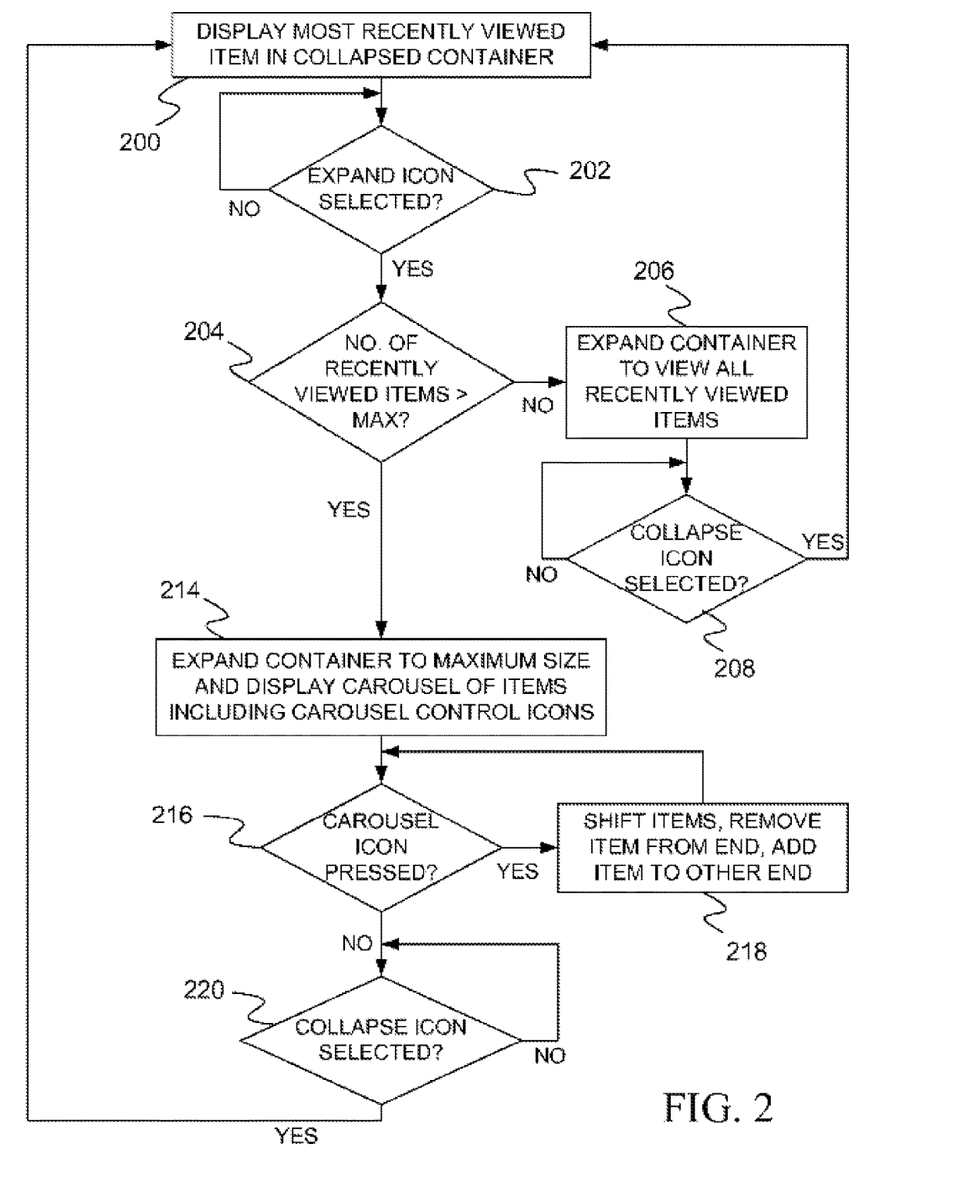
FIG. 2 is a flow diagram of a method in accordance with one embodiment.

FIG. 2 provides a flow diagram of a method of expanding and contracting container 102 of FIG. 1. In step 200 of FIG. 2, the most recently viewed item is displayed in a collapsed container as shown in FIG. 1. In accordance with some embodiments, recently viewed items comprise items that have been selected by a customer resulting in the presentation of detailed information about the selected item. In other embodiments, the recently viewed items can include any item that the user has shown more of an interest in than other items. Note that recently viewed items typically do not include all items that have been presented on the display since there is no way to confirm that a user has actually viewed an item unless the user interacts in some way with the item.

At step 202, a processor waits to receive an input indicating that expansion icon 116 has been selected. At step 204, the processor determines if the number of recently viewed items is greater than a maximum number of recently viewed items that can be displayed in an expanded container.

If the number of recently viewed items is not greater than the maximum number of items that can be displayed, container 102 is expanded at step 206 to view all recently viewed items. In particular, container 102 is expanded to different sizes depending on the number of recently viewed items.

Figure 3:
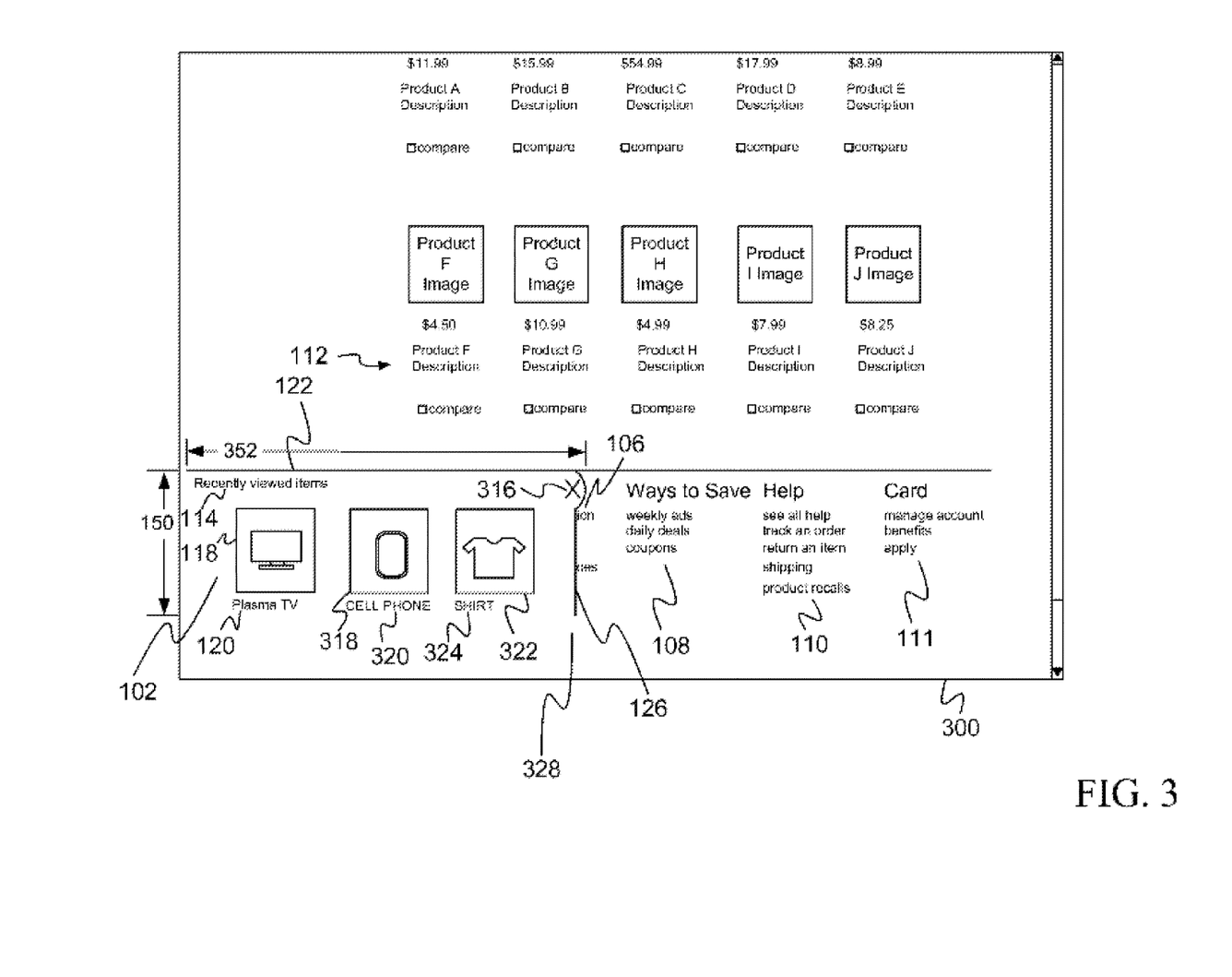
FIG. 3 is a view of a display showing an enlarged recently viewed items container in accordance with one embodiment.

FIG. 3 shows a graphical image 300 with an example of an expanded container 302, also referred to as an expanded window, an expanded graphical element, a second-sized displayed container and an enlarged viewed-items element, that is displayed after a user has selected expansion icon 116 of FIG. 1. Expanded container 302 includes "recently viewed items" text 114, image 118 of a most-recently viewed item and text 120 of the most-recently viewed item in the same manner as shown in container 102 of FIG. 1. In addition, container 302 includes image 318 and text 320 of a penultimate viewed item (the item viewed before the most-recently viewed item) and image 322 and text 324 of the item viewed before the penultimate viewed item. Container 302 also includes a collapse or close icon 316, shown as an X in FIG. 3, top border 340 and right side edge/end 126. In accordance with some embodiments, top border 340 may not be visible. Container 302 has a same height 150 as container 102 but has a larger width 352 than width 152 of container 102. Due to its increased width 352, container 302 completely obscures the text of column 104 and partially obscures the text of column 106. As such, the expansion of container 302 is shown to have occurred over the top of the text of column 104 and the text of column 106.

Under some embodiments, the expansion of container 102 into an expanded container that shows all of the recently viewed items involves moving right edge/end 126 to different positions depending on the number of recently viewed items. Thus, as shown in FIG. 3, right end 126 is moved to position 328 when there are three recently viewed items. When there are four recently viewed items, right end 126 is moved to a different position that is farther to the right to accommodate the additional recently viewed item. When there are five recently viewed items, right end 126 moves to a third position that is even farther to the right. In all of these positions, all of the recently viewed items are displayed.

At step 208, the processor waits for the customer to press collapse icon 316 of FIG. 3. When the customer selects collapse icon 316, the display returns to the state shown in FIG. 1 with the most recently viewed item shown in collapsed container 102 at step 200.

Transitions from collapsed container 102 to expanded container 302 and from expanded container 302 to collapsed container 102 may be shown as an animation. Specifically, during expansion, outer or right side edge 126 of collapsed container 102 moves in a horizontal direction 128 over time to arrive at position 328 (FIG. 3). As edge 126 moves, portions of image 318 and text 320 are gradually exposed until the entirety of image 318 and 320 can be seen and then portions of image 322 and text 324 are gradually exposed until all of image 322 and text 324 can be seen. During contraction, outer or right side edge 126 of expanded container 302 moves in a direction 329 over time to arrive at position 129 (FIG. 1). As edge 126 moves, portions of image 322 and text 324 are removed until all of image 322 and text 324 have been removed and then portions of image 318 and text 320 are removed until all of image 318 and text 320 have been removed.

During the process of FIG. 2, the customer may select additional items to view in detail at any time. When this occurs, a page containing the details of the selected item is requested from the server and is rendered on the display. The list of recently viewed items is then updated in memory either by the client or by the server. The list of most recently viewed items is an ordered list in which the order of an item within the list indicates when it was viewed relative to the other items in the list. After the recently viewed item list is updated, the new most recently viewed item can be displayed in a collapsed container, such as collapsed container 102, on any desired web page including the page providing the detailed information about the selected item. Thus, upon selection of an item for viewing, the process of FIG. 2 is reset to step 200 with a new most recently viewed item.

Figure 4:
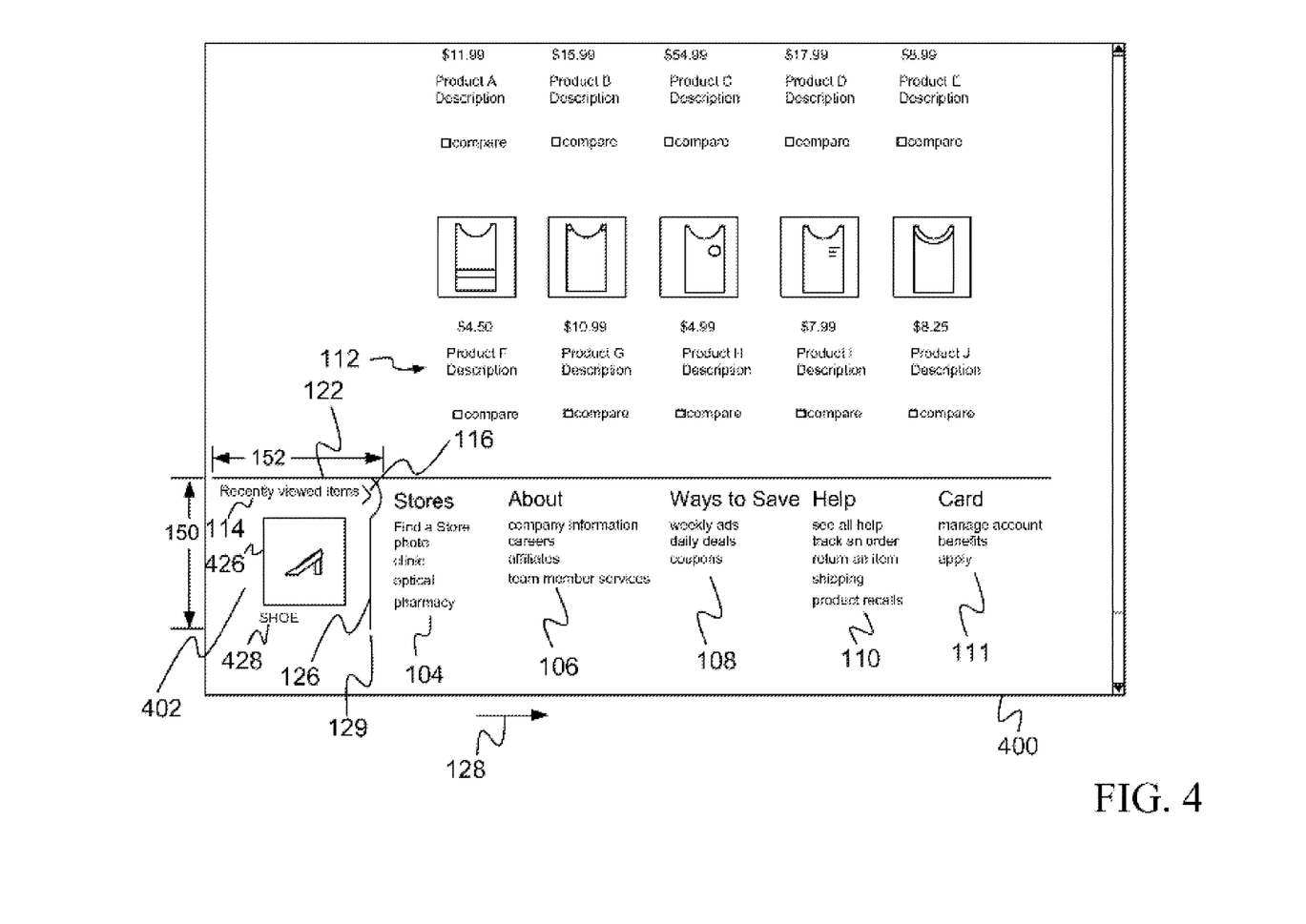
FIG. 4 is view of a display showing a collapsed recently viewed items container in accordance with one embodiment.

FIG. 4 shows a graphical image 400 displayed at step 200 after five additional items had been viewed. Display 400 includes the same text 112 and text columns 104, 106, 108, 110 and 111 of FIG. 1. In addition, display 400 includes collapsed container 402 which includes "recently viewed items" text 114, expansion icon 116, top border 122, and right side edge 126. Collapsed container 402 has a width 152 and a height 150 that is the same as collapsed container 102 of FIG. 1. Collapsed container 402 includes a new image 426 and corresponding text 428. This new image and corresponding text is for the most recently viewed item and has replaced the image 118 and text 120 shown in FIG. 1.

From the state shown in FIG. 4, when input is received that expand icon 116 has been selected at step 202 and the number of recently viewed items is greater than the maximum number of items that can be viewed in a container at step 204, the process of FIG. 2 continues at step 214 where the container is expanded to its maximum size and a carousel of items is displayed within the container including at least one carousel control icon.

Figure 5:
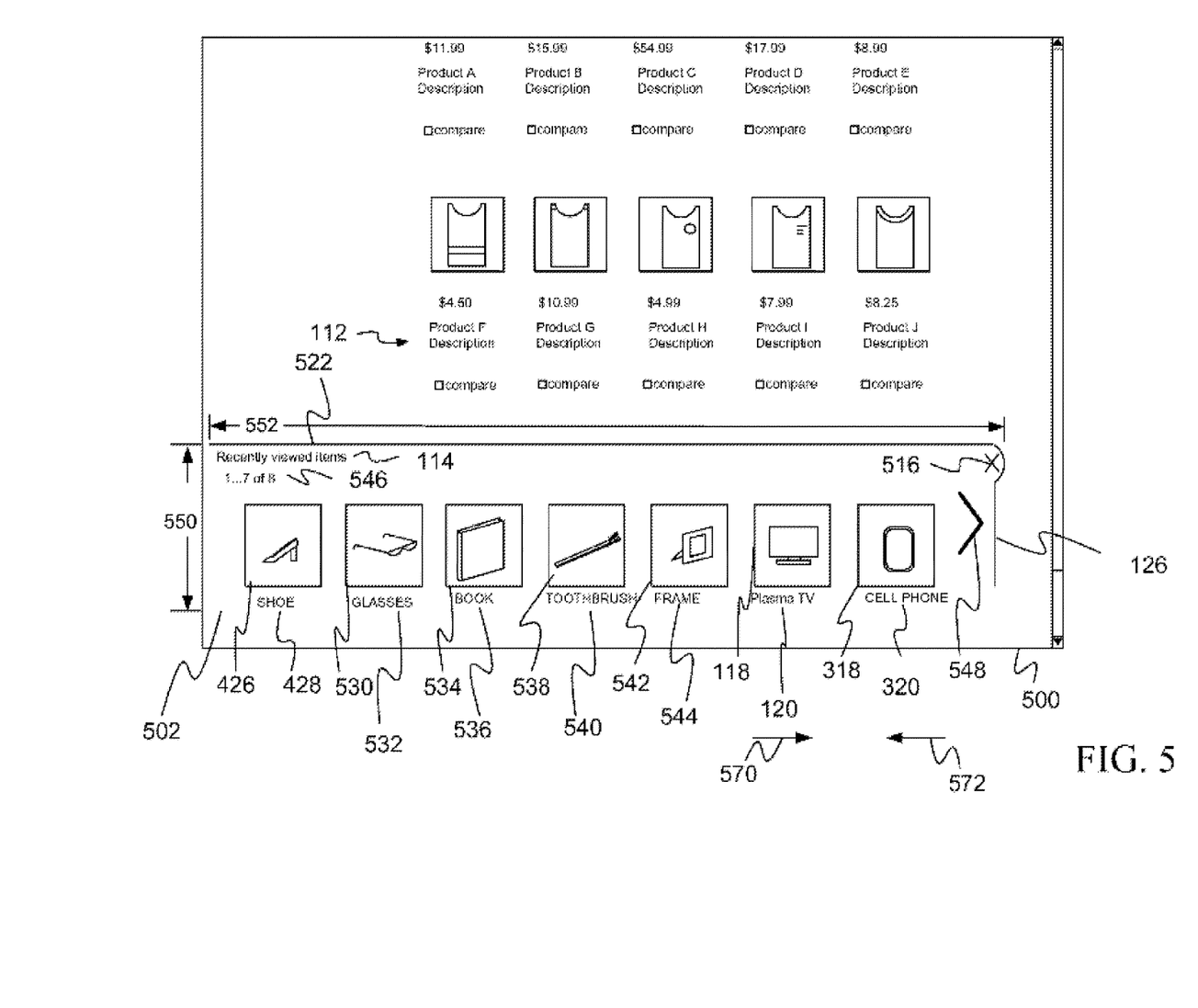
FIG. 5 is a view of a display showing a maximally enlarged recently viewed items container in accordance with one embodiment.

FIG. 5 provides an example of a generated display 500 having an expanded container 502, also referred to as an expanded window, expanded graphical element, second-sized displayed container, and enlarged viewed-items element, that includes "recently viewed items" text 114, collapsing icon 516, top border 522, right side edge 126 and numbering legend 546, which indicates ordinal numbers of the recently viewed items that are displayed in container 502 (1 . . . 7) and the total number of recently viewed items (8). Container 502 has a height 550 that is the same as height 150 of FIG. 1 and a width 552 that is larger than width 152 of FIG. 1 and larger than width 352 of FIG. 3.

Within container 502, an image 426 and text 428 of a most recently viewed item is shown on the far left of a row of recently viewed items. The row of recently viewed items also includes images 530, 534, 538, 542, 118 and 318 and corresponding text 532, 536, 540, 544, 120 and 320 of other recently viewed items in the order in which they were viewed with the more recently viewed items beginning on the left and the earlier viewed items on the far right. Note that image 118 and corresponding text 120 are now positioned six positions from the left indicating that image 118 is for an item that is no longer the most recently viewed item as it was in FIG. 1 but instead is the sixth most recently viewed item. The items associated with images 426, 530, 534, 538 and 542 having been viewed after it. Since image 426 and corresponding text 428 are on the far left, they represent the most recently viewed item.

Container 502 also includes a carousel control 548. Carousel control 548 is selectable by the user. If the carousel control 548 is selected at step 216, the images of items in container 502 are shifted to the left at step 218 such that image 426 and 428 of the most recently viewed item is removed from container 502 and an older viewed item is added to container 502.

Figure 6:
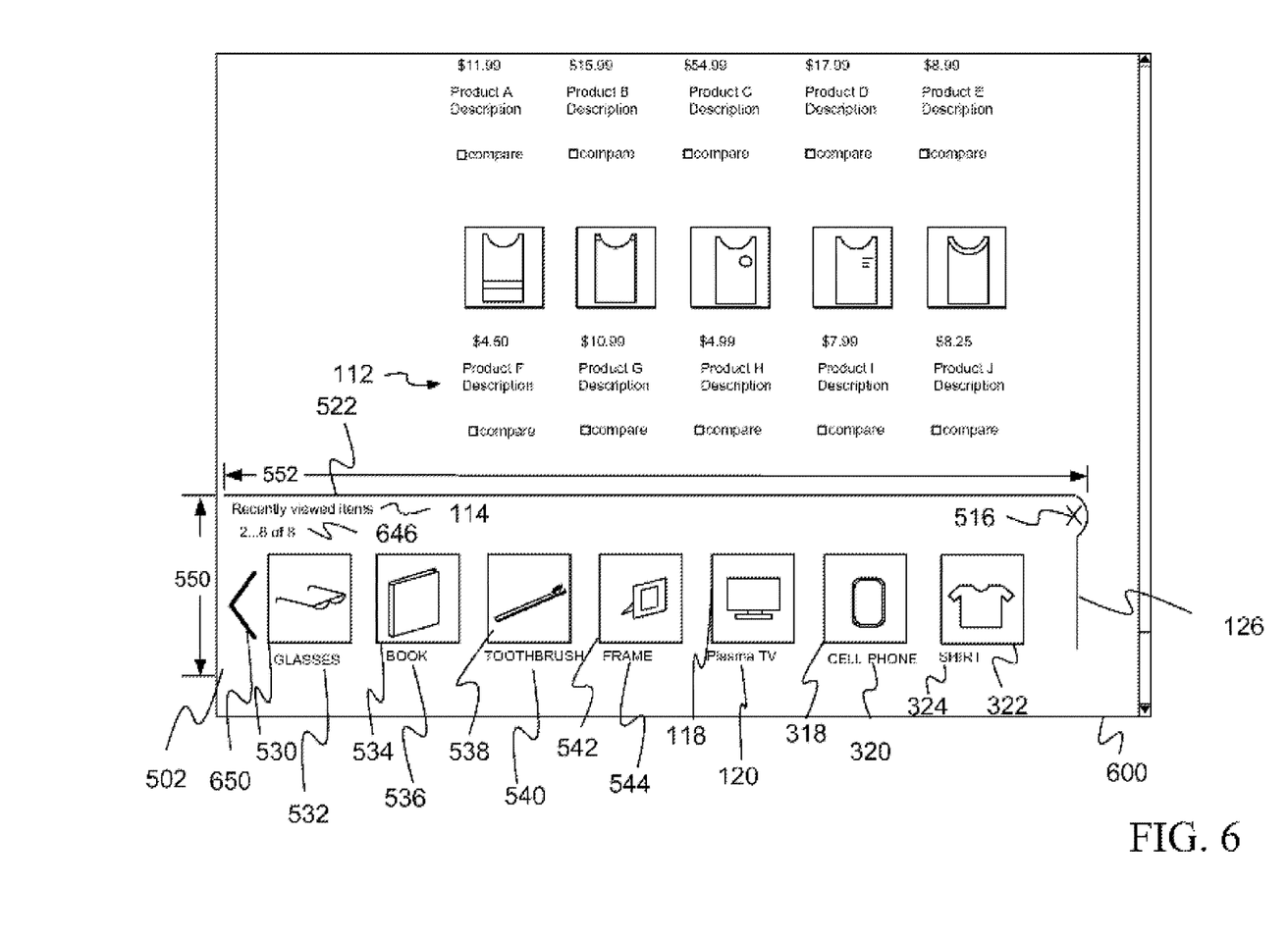
FIG. 6 is a view of a display showing a maximally enlarged recently viewed items container in accordance with one embodiment.

FIG. 6 provides a display 600 showing the results of selecting carousel control icon 548 in FIG. 5. In FIG. 6, container 502 shows different content from container 502 of FIG. 5 in that the image 426 and text 428 of the most recently viewed item has been removed and images 530, 534, 538, 542, 118 and 318 as well as corresponding text 532, 536, 540, 544, 120 and 320 have been shifted to the left. In addition, image 322 and corresponding text 324 of a recently viewed item has been added to the far right of the row of items. Further, carousel control 548 has been removed and carousel control 650 has been added. Carousel control 548 has been removed since there are no earlier viewed items in the ordered list of recently viewed items. Carousel control 650 has been added so that upon its selection at step 216, the items displayed will be shifted to the right at step 218 such that image 322 and corresponding text 324 will be removed and such that the most recently viewed item 426 and corresponding text 428 will be added to the display to return it to the state shown in FIG. 5. Note that if there were more recently viewed items, both carousel control 650 and carousel control 548 would be displayed in FIG. 6.

Cardinal numbers 646 in container 502 of FIG. 6 have also changed from cardinal numbers 546 of FIG. 5 to indicate that the items displayed have cardinal number 2-8, thereby indicating that the most recently viewed item is not currently shown in container 502.

After the items have been shifted at step 218 of FIG. 2, the process returns to step 216 to determine if a carousel icon, such as carousel icon 650, is selected and to step 220 to determine if the collapse icon has been pressed. Note that steps 216 and 220 are shown as occurring at different times, however, in an event driven system, steps 216 and 220 occur concurrently as the system waits for either a carousel icon or the collapse icon to be pressed at the same time.

If the collapse icon 516 is pressed at step 220, the process returns to step 200 to display the most recently viewed item in a collapsed container. Regardless of whether this occurs from either the state of container 502 shown in FIG. 6 or the state of container 502 shown in FIG. 5, step 200 involves displaying the collapsed container 402 of FIG. 4 with image 426 and corresponding text 428 of the most recently viewed item. Thus, the most recently viewed item is displayed regardless of whether the most recently viewed item was being displayed in the expanded container as shown in FIG. 5 or whether the most recently viewed item was not displayed in the expanded container as shown in FIG. 6.

In transitioning between collapsed container 402 and expanded container 502, an animation is shown under some embodiments. For example, during the transition from collapsed container 402 to expanded container 502 an animation is shown depicting leading edge 126 moving in a direction 570. During the transition from expanded container 502 to collapsed container 402, edge 126 moves in a direction 572.

As edge 126 moves during the transition from collapsed container 402 to expanded container 502, more of the recently viewed items will be displayed beginning with the penultimate viewed item represented by image 530 and corresponding text 532 and progressing through the list of most recently viewed items in order. In the transition from expanded container 502 to collapsed container 402, the images and corresponding text of the displayed items are progressively removed until only the image and corresponding text of the most recently viewed item is displayed. In addition, if the most recently viewed item is not displayed in expanded container 502, carousel control 650 is replaced with the most recently viewed item before, during or after the animated movement of edge 126.

In the method shown in FIG. 2, a customer may select any of the items currently displayed in the recently viewed items container at any time in the method. When a recently viewed item is selected from the recently viewed items container, a detailed description of the item is presented to the user. In most embodiments, this involves requesting a new web page that contains the details of the selected item.

Figure 7:
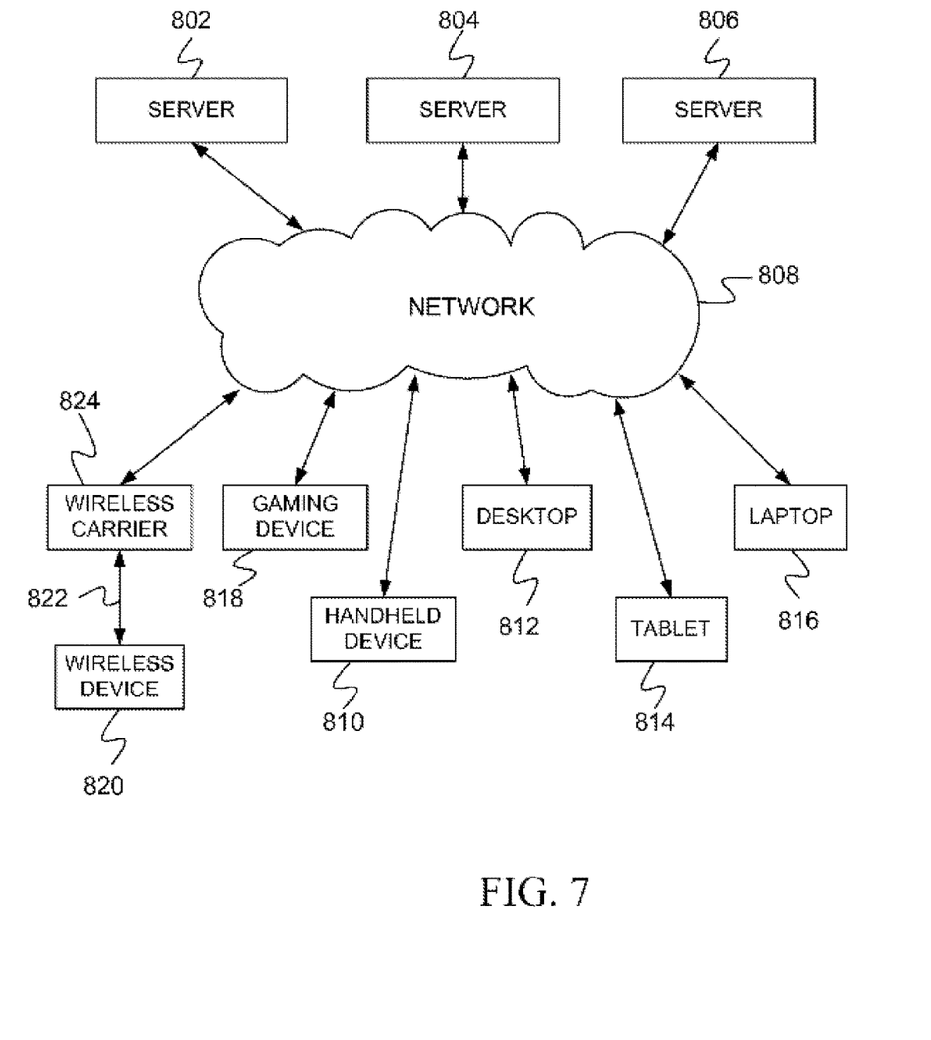
FIG. 7 is a block diagram of a server-client environment.

FIG. 7 provides a block diagram of a network environment which embodiments of the present invention may be practiced. In FIG. 7, a collection of servers 802, 804 and 806 store one or more webpages that can be requested by client devices through a network connection 808. Such network connections can include the Internet or other wide area networks or an intranet or other local area networks. Client devices can include, for example, handheld device 810, desktop 812, tablet 814, laptop 816, gaming device 818 or a wireless device 820. Wireless device 820, including such devices as cellular phones, can request webpages through a cellular connection 822 to a wireless carrier 824, which is connected to the network 808. The client devices listed for FIG. 7 are examples of available client devices and other client devices that are capable of connecting through a network 808 to one or more servers 802, 804 and 806 can be used with the present invention.

Communication along network 808 can utilize one or more protocols including Hypertext Transfer Protocol (http), Transmission Control Protocol/Internet Protocol (TCP/IP) and the like. The web pages provided by servers 802, 804 and 806 may be written in a mark-up language such as Hypertext Markup Language (HTML) or Extensible Markup Language (XML) and may utilize one or more Cascade Style Sheets. In addition, the web pages provided by servers 802, 804 and 806 may use one or more scripts for rendering the page including for example JavaScript®, from Oracle Corporation.

Figure 8:
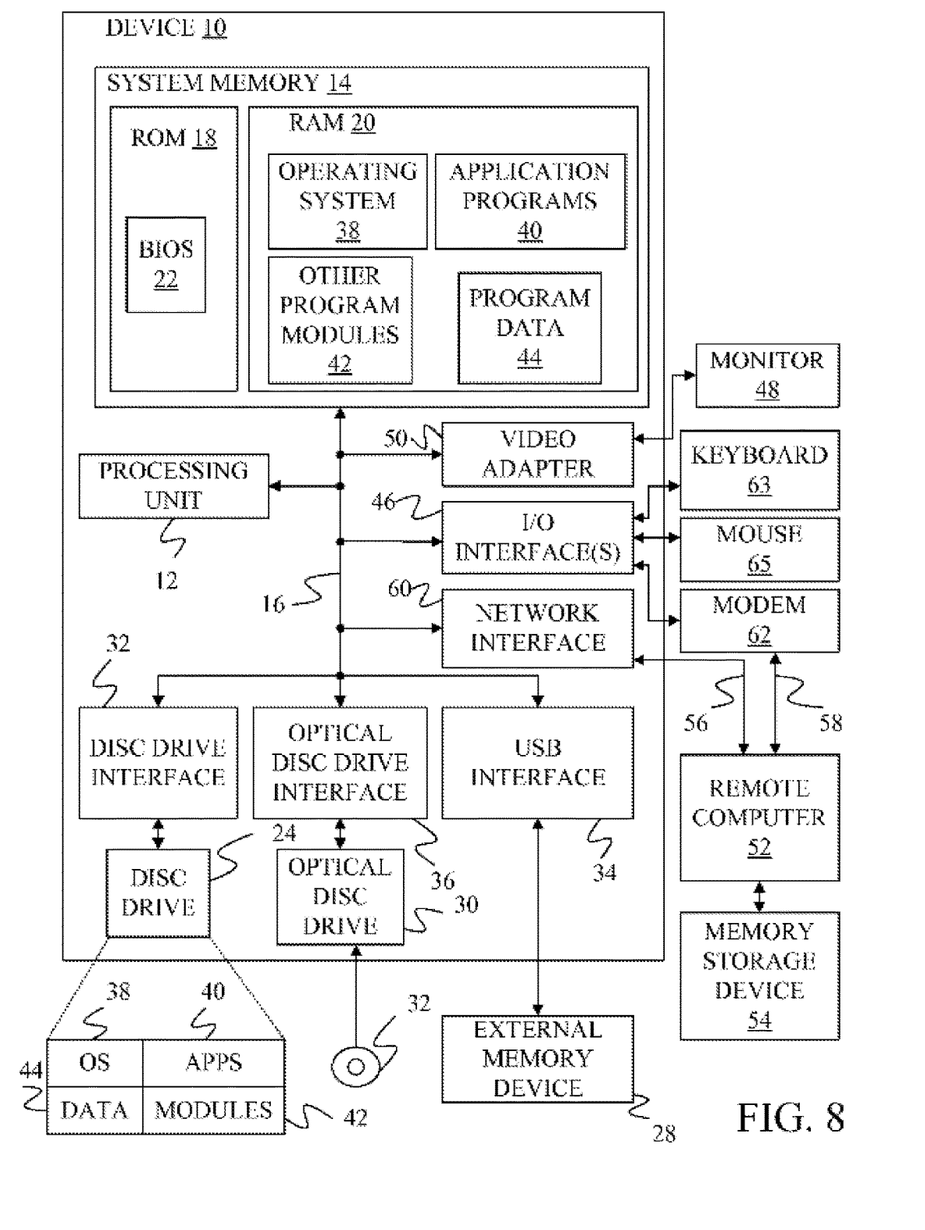
FIG. 8 is a block diagram of a computing device.

An example of a computing device that can be used as a server and/or client device in the various embodiments is shown in the block diagram of FIG. 8. The computing device 10 of FIG. 8 includes a processing unit or processor 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a hard disc drive 24, an external memory device 28, and an optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include server instructions that handle requests for web pages from a client, retrieve the content of the web pages and serve the web pages to the client when the computing device is used as a server. When the computing device is used as a client, application programs 40 can include a web browser that receives, interprets and renders one or more of the web pages described above. Such web browsers include script interpreters that are able to interpret script code in the web pages including script code that performs the steps of FIG. 2. The combination of the web browser and any script code in the web page can be considered computer-executable instructions that are stored on a computer-storage medium for execution by a processor. Program data 44 may include images and text that form one or more of the web pages including images of the product, images of one or more of the buttons, and the text in the containers. In addition, program data 44 can include the count of the number of items that have been recently viewed and the recently viewed items list.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 8. The network connections depicted in FIG. 8 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program, such as data stored in the databases or lists described above, may illustratively be stored within memory storage device 54. It will be appreciated that the network connections shown in FIG. 8 are exemplary and other means for establishing a communications link between the computers, such as a wireless interface communications link, may be used.

Processor/processing unit 12 executes computer-executable instructions to perform the steps described above. In particular, the processor displays a most recently viewed item in a display element and positions the display element next to at least one other element on a web page. The processor expands the display element so that the element covers the at least one other element on the web page and so that at least one other recently viewed item appears in the display element. The processor contracts the display element so that only the most recently viewed item appears in the display element and so that the at least one other element on the web page is visible.

To expand the display element, the processor moves one end of the display element to a first position to view a first number of recently viewed items and to a second position to view a second number of recently viewed items. The processor further moves the end of the display element to a third position and displays carousel controls within the display element.

The processor further receives an input indicating that the carousel control has been selected and in response removes the most recently viewed item from the display element. The processor then receives an input indicating that the display element should be contracted. In response, the processor contracts the display element so that only the most recently viewed item appears in the display element.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A non-transitory computer storage medium having computer executable instructions that when executed cause a processor to perform steps comprising:
   determining whether a user has interacted with at least one item;
   displaying a first-sized graphical element only after determining that at least one item has been interacted with by a user;
   displaying a plurality of items in the first-sized graphical element, the plurality of items including a latest item, the latest item being an item the user has interacted with more recently than any other of said plurality of items in the first-sized graphical element;
   receiving input indicating that the first-sized graphical element should be collapsed; and
   automatically reducing the size of the first-sized graphical element to form a collapsed graphical element so that only the latest item is displayed in the collapsed graphical element in response to the input.

2. The non-transitory computer storage medium of claim 1, wherein the plurality of items include a plurality of products being offered for sale by a retailer.

3. The non-transitory computer storage medium of claim 1, wherein the first-sized graphical element includes at least one user activated collapsing icon for collapsing the first-sized graphical element.

4. The non-transitory computer storage medium of claim 1, wherein at least one user activated expansion icon is disposed in the first-sized graphical element when the first-sized graphical element is in the collapsed state wherein upon activation of the user activated expansion icon the first-sized graphical element is expanded from the collapsed state.

5. The non-transitory computer storage medium of claim 1, wherein the computer executable instructions that when executed cause the processor to perform the further step of:
   displaying the first-sized graphical element on a first portion of a retailer web page.

6. The non-transitory computer storage medium of claim 5, wherein the retailer web page includes a second portion depicting a plurality of products a retailer is offering for sale.

7. The non-transitory computer storage medium of claim 5, wherein the second portion is disposed above the first portion.

8. A non-transitory computer storage medium having computer executable instructions that when executed cause a processor to perform steps comprising:
   determining whether a user has interacted with at least one item;
   displaying a first-sized graphical element only after determining that at least one item has been interacted with by a user;
   displaying a plurality of items in the first-sized graphical element, the plurality of items including a latest item, the latest item being an item the user has interacted with more recently than any other of said plurality of items in the first-sized graphical element;
   receiving input indicating that the first-sized graphical element should be collapsed;
   automatically reducing the size of the first-sized graphical element to form a collapsed graphical element so that only the latest item is displayed in the collapsed graphical element in response to the input; and,
   prior to receiving input indicating that the first-sized graphical element should be collapsed, automatically increasing the size of the first-sized graphical element based on the number of items the user has interacted with within a predetermined time period.

9. The non-transitory computer storage medium of claim 8, wherein the first-sized graphical element is an adjustable window having an expansion icon visible when the adjustable window is in the collapsed state and a collapsing icon visible when the adjustable window is in an expanded state.

10. The non-transitory computer storage medium of claim 9, wherein the computer executable instructions that when executed cause the processor to perform the further step of:
    generating an animation showing a transition of the adjustable window between the expanded state and the collapsed state.

11. The non-transitory computer storage medium of claim 8, wherein the computer executable instructions that when executed cause the processor to perform the further step of:
    tracking items on at least one web page that a user has viewed within the predetermined time period.

12. The non-transitory computer storage medium of claim 8, wherein the at least one web page includes at least one web page of a retailer.

13. The method of claim 9, wherein the adjustable window has a first height and a first length in the expanded state and a height equal to the first height and a length less than the first length in the collapsed state.

14. The non-transitory computer storage medium of claim 11, wherein the computer executable instructions that when executed cause the processor to perform the further steps of:
    displaying the first-sized graphical element below a product section of the at least one web page depicting a plurality of products being offered for sale by a retailer;
    displaying another web page upon receiving user interaction with at least one of the plurality of products in the product section of the at least one web page; and
    displaying the first-sized graphical element on at least a portion of the another web page.

15. A non-transitory computer storage medium having computer executable instructions that when executed cause a processor to perform steps comprising:
    determining whether a user has interacted with at least one item;
    displaying a first-sized graphical element only after determining that at least one item has been interacted with by a user;
    displaying a plurality of items in the first-sized graphical element, the plurality of items including a latest item, the latest item being an item the user has interacted with more recently than any other of said plurality of items in the first-sized graphical element;
    receiving input indicating that the first-sized graphical element should be collapsed;
    automatically reducing the size of the first-sized graphical element to form a collapsed graphical element so that only the latest item is displayed in the collapsed graphical element in response to the input; and,
    prior to receiving input indicating that the first-sized graphical element should be collapsed, performing each of the following steps:
       determining, based on further user interaction that the number of items on at least one web page the user has interacted with within a predetermined period of time exceeds a maximum value;

providing on a portion of the at least one web page the first-sized graphical element in a maximum expanded state, and the first-sized graphical element in the maximum expanded state includes an interactive viewing portion which a user can interact with to view all of a first set of items the user has interacted with within the predetermined period of time where the number of items in the first set of items is greater than the maximum value; and, receiving viewing input indicating that the interactive viewing portion has been activated in such a manner that the latest item is not displayed in the first-sized graphical element in the maximum expanded state.

16. The non-transitory computer storage medium of claim 15, wherein the maximum value is equal to the number of items that can be displayed in the first-sized graphical element in the maximum expanded state at a given time.

17. The non-transitory computer storage medium of claim 16, wherein the interactive viewing portion is a rotating carousel which a user can interact with to view all items in said first set of items.

18. The non-transitory computer storage medium of claim 17, wherein the rotating carousel includes at least one rotating carousel control.

19. The non-transitory computer storage medium of claim 17, wherein the rotating carousel is horizontally oriented.

20. The non-transitory computer storage medium of claim 15, wherein the first set of items includes a plurality of products being offered for sale by a retailer.

* * * * *